United States Patent [19]

Aufdermarsh, Jr.

[11] 4,316,836

[45] Feb. 23, 1982

[54] STABILIZED FLUOROELASTOMER COMPOSITIONS

[75] Inventor: Carl A. Aufdermarsh, Jr., Newark, Del.

[73] Assignee: E. I. Du Pont de Nemours and Company, Wilmington, Del.

[21] Appl. No.: 143,817

[22] Filed: Apr. 23, 1980

[51] Int. Cl.$^3$ .......................... C08K 5/08; C08K 5/16
[52] U.S. Cl. ................ 260/42.21; 260/42.27
[58] Field of Search ............. 260/45.8 N, 42.21, 42.27

[56] References Cited

U.S. PATENT DOCUMENTS

| | | | |
|---|---|---|---|
| 3,244,720 | 4/1966 | Meschino | 260/45.8 N |
| 3,467,638 | 9/1969 | Pattison | 260/544 |
| 3,546,186 | 12/1970 | Gladding | 260/42.27 |
| 3,579,474 | 5/1971 | Ro | 526/91 |
| 3,580,889 | 5/1971 | Barney | 260/42.27 |
| 3,642,742 | 2/1972 | Carlson | 526/206 |
| 3,682,872 | 8/1972 | Brizzolara et al. | 260/42.27 |
| 3,707,469 | 12/1972 | Jaffe | 260/17 R |
| 3,817,960 | 6/1974 | Resnick | 526/22 J |
| 3,819,594 | 6/1974 | Holmes et al. | 526/229 |
| 3,852,237 | 12/1974 | Osborn et al. | 260/42.21 |
| 3,855,191 | 12/1974 | Doughty et al. | 526/247 |
| 3,946,136 | 3/1976 | Fitz et al. | 260/42.27 |
| 4,015,998 | 4/1977 | Jaffe | 106/288 Q |

FOREIGN PATENT DOCUMENTS 11853 6/1980 European Pat. Off. .
1496084 12/1977 United Kingdom .

OTHER PUBLICATIONS

Chem. Abst. 81-50741k, (1974), Shiomura et al., J74-0781, Jan. 16, 1974.
Chem. Abst. 90-39558w, (1979), Muller "Pigment Selection . . . ", (Du Pont).
Chem. Abst. 75-37446z, (1971), Oxley (DT2040380), Apr. 22, 1971, (ICI).
Kalb et al., "Polym. Rxs . . . ,"Adv. in Chem. Ser. #129, pp. 13-26, (1973).
Kirk Othmer Encycl. of Chem. Tech., vol. 15, pp. 581-582.
Derwent Abst. 08748 A/05 (FR2347389), 12-9-77, Du Pont.
Derwent Abst. 30107 Y/17 (J52035289), 3-17-77, ASAH1 Glass.

*Primary Examiner*—Herbert J. Lilling

[57] ABSTRACT

Vulcanizates of certain fluoroelastomer terpolymer compositions, wherein the terpolymer is derived from tetrafluoroethylene, perfluoro(methyl vinyl ether), and a cure-site monomer, and further wherein the composition contains non-black filler, exhibit significantly improved stability upon heat aging when small quantities of quinacridone-type pigments are incorporated therein.

11 Claims, No Drawings

STABILIZED FLUOROELASTOMER COMPOSITIONS

TECHNICAL FIELD

This invention relates to certain vulcanizable fluoroelastomer compositions, wherein the fluoroelastomer is a terpolymer derived from tetrafluoroethylene, perfluoromethyl perfluorovinyl ether and a cute-site monomer, which terpolymers are vulcanizable to useful elastomeric materials characterized by excellent physical properties and resistance to environmental attack. These materials can be fabricated into mechanical parts such as O-rings, flange seals, gasket stock, pump diaphragms and liners and are particularly useful where extraordinary resistance to heat and corrosive fluids is required. In particular, this invention relates to improvements in stability of such compositions containing non-black fillers upon heat aging by incorporating therein small quantities of quinacridone-type pigments.

BACKGROUND ART

Kalb et al., "Polymerization Reactions and New Polymers", Advances in Chemistry Series, No. 129, 13–26 (1973) discloses certain copolymers of tetrafluoroethylene, perfluoro(methyl vinyl ether) and a third monomer selected from the group consisting of:

(a) perfluoro(4-cyanobutyl vinyl ether),
(b) perfluoro(4-carbomethoxybutyl vinyl ether),
(c) perfluoro(2-phenoxypropyl vinyl ether), and
(d) perfluoro(3-phenoxypropyl vinyl ether).

Kalb et al also discloses the outstanding solvent and chemical resistance that can be obtained with these elastomers.

U.S. Pat. No. 3,546,186 granted Dec. 8, 1970 to Gladding and Sullivan, discloses certain vulcanizable copolymers of substituted perfluorovinyl ether. In particular, among the many and varied copolymers disclosed by Gladding and Sullivan, there are disclosed terpolymers derived from tetrafluoroethylene, perfluoromethyl perfluorovinyl ether and a cure-site monomer which can be, among other things, perfluoro(4-cyanobutyl vinyl ether) or perfluoro(4-carbomethoxybutyl vinyl ether).

U.S. Pat. No. 3,467,638, granted Sept. 16, 1969 to Pattison, discloses certain vulcanizable copolymers of substituted perfluorovinyl ethers. In particular, among the many and varied copolymers disclosed by Pattison, there are disclosed terpolymers derived from tetrafluoroethylene, perfluoromethyl perfluorovinyl ether and a cure-site monomer which can be, among other things, perfluoro(2-phenoxypropyl vinyl ether).

U.S. Pat. No. 3,682,872, granted Aug. 8, 1972 to Brizzolara and Quarles, discloses certain vulcanizable copolymers of substituted perfluorovinyl ethers. In particular, among the many and varied copolymers disclosed by Brizzolara and Quarles there are disclosed terpolymers derived from tetrafluoroethylene, perfluoromethyl perfluorovinyl ether and, as a cure-site monomer perfluoro(3-phenoxypropyl vinyl ether).

Copending U.S. patent application Ser. No. 83,751, filed Oct. 22, 1979 by Breazeale, discloses certain vulcanizable copolymers of tetrafluoroethylene, perfluoromethyl perfluorovinyl ether, and a cure-site monomer which can be perfluoro(8-cyano-5-methyl-3,6-dioxa-1-octene).

It is non-black filled fluoroelastomer compositions based on the polymers disclosed in the background art summarized above which can be improved by the incorporation therein of small quantities of quinacridone-type pigments.

DISCLOSURE OF THE INVENTION

The present invention relates to certain vulcanizable fluoroelastomer compositions, wherein the fluoroelastomer is a terpolymer derived from tetrafluoroethylene, perfluoromethyl perfluorovinyl ether and a cure-site monomer, and further wherein said composition contains at least one non-black filler, said compositions further containing a small quantity of at least one quinacridone-type pigments. The fluoroelastomer compositions of the present invention possess surprisingly superior stability upon heat aging as compared with prior similar compositions containing no quinacridone-type pigment.

The terpolymers used in the composition of the present invention are substantially as described by Kalb et al, Gladding and Sullivan, Pattison, Brizzolara and Quarles, and Breazeale in the references cited above and generally comprise copolymerized units of about 53–79.8 mole percent of tetrafluoroethylene (TFE), about 20–45 mole percent of perfluoromethyl perfluorovinyl ether (PMVE), and 0.2–2 mole percent of a cure-site monomer selected from the group consisting of:

(a) perfluoro(4-cyanobutyl vinyl ether),
(b) perfluoro(4-carbomethoxybutyl vinyl ether),
(c) perfluoro(2-phenoxypropyl vinyl ether),
(d) perfluoro(3-phenoxypropyl vinyl ether), and
(e) perfluoro(8-cyano-5-methyl-3,6-dioxa-1-octene).

Such terpolymers can be prepared by the procedures taught in the references cited above, and to the extent necessary to enable one of ordinary skill in the art to prepare the compositions of the present invention, the subject matter of Kalb et al. "Polymerization Reactions and New Polymers", Advances in Chemistry Series, No. 129, 13–26 (1973), U.S. Pat. No. 3,546,186; U.S. Pat. No. 3,467,638; U.S. Pat. No. 3,682,872 and U.S. application Ser. No. 83,751 are hereby incorporated by reference into the present application. Preferably the compositions of the present invention are based upon terpolymers in which the cure-site monomer is perfluoro(2-phenoxypropyl vinyl ether), and most preferably, they are based on such terpolymers in which the proportions of the monomers are about 65.4–73.6 mole percent TFE, 26–34 mole percent PMVE, and the remainder is perfluoro(2-phenoxypropyl vinyl ether). It should be understood that exact determination of the monomer proportions is difficult and that the values given are estimates based on infrared spectra. Nevertheless, the values recited are believed reasonably accurate and precise.

As with conventional vulcanizable fluoroelastomer compositions, it is frequently desirable to mix fillers, reinforcing agents, stabilizers, plasticizers, lubricants or processing aids with the elastomer prior to vulcanization. Although a common additive is carbon black, frequently it is desirable to use one or more non-black fillers, such as titanium dioxide, zirconium dioxide, silica, clay and asbestos.

When the fluoroelastomer composition contains such as non-black filler, the stability upon heat aging can be significantly improved by incorporating therein a small quantity, 0.1–10 phr, preferably 0.5–6 phr, and most preferably 1-3 phr, of at least one quinacridone-type pigment.

Quinacridone-type pigments are generally known (see, e.g., Kirk-Othmer Encyclopedia of Chemical Technology, vol. 15, pp. 581-2 (1968) and the following U.S. Pat. Nos.: 3,160,510; 3,686,009; and 3,748,162) and are commercially available. Such pigments may be quinacridone

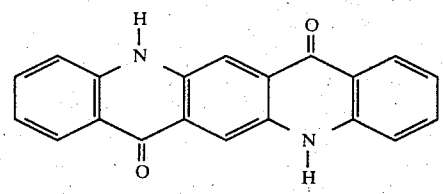

quinacridone quinone

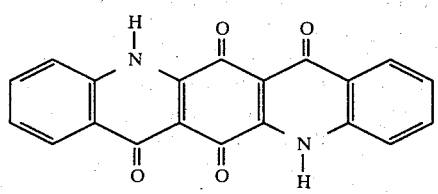

substituted (e.g., alkyl or halo substituted) quinacridone, substituted quinacridone quinone, and mixtures and solid solutions of such substituted and unsubstituted quinacridones and quinacridone quinones. For example, the following quinacridone pigments have demonstrated the ability to improve the stability, upon heat aging, of non black filled fluoroelastomer compositions based on TFE/PMVE/P2PVE terpolymers:

Colour Index Orange-48, which is a solid solution of quinacridone quinone, quinacridone and dihydroquinacridone; Colour Index Violet-19 (C.I. no. 46 500), which can be a gamma quinacridone or a beta quinacridone; Colour Index Red-206, which is a solid solution containing quinacridone; Colour Index Orange-49, which is a solid solution containing quinacridone quinone and dihydroquinacridone; Monastral ® transparent Red B pigment, which is a solid solution containing quinacridone; and Colour Index Red 202, which is a solid solution containing dichloroquinacridone quinone.

Preferred pigments include Colour Index Orange-48, Colour Index Red-206, and Colour Index Orange-49. The most preferred fluoroelastomer composition of the present invention is one based on a TFE/P-MVE/P2PVE terpolymer in which the monomer mole ratio is approximately 65.4-73.6/26-34/0.4-0.6 and which includes about 2-3 phr of Colour Index Red-206 pigment.

The following examples illustrate the fluoroelastomer compositions of the present invention and demonstrate their improved stability, upon heat aging, as compared with similar compositions that do not contain any quinacridone-type pigment. In each of the following examples, standard elastomer processing and testing procedures were employed. Compounds were milled on a standard two-roll rubber mill at 60° C. Slabs were sheeted off the mill at the desired thicknesses. O-ring preforms were cigar-rolled on the mills. Slabs (6"×6"×0.080" i.e., 15.2×15.2×0.203 cm), pellets (Yerzley type, ASTM 0945, ½"×¾" i.e., 1.27×1.91 cm) and O-rings (1" ID×¾" cross-sectional diameter i.e. 2.54 cm ID×0.32 cm cross-sectional diameter) were press cured in the appropriate molds at 190° C. for 30 minutes. Parts were removed from the molds and post-cured for 2 or 5 days under nitrogen in an oven whose temperature was programmed to rise from 25° C. initially to 288° C. for the last 24 hours.

Post-cured parts were tested as follows: small dumbbells (3½"×⅛" with ⅝" wide tabs i.e., 8.89×0.64 cm with 1.59 cm wide tabs) were died out of the slabs and pulled on the Instron at room temperature at 10 in./min. i.e., 25.4 cm/min. Readings for modulus at 100% elongation ($M_{100}$), tension at break ($T_B$), elongation at break ($E_B$), and permanent set (PS) were taken in accordance with ASTM D-412. Pellets and O-rings were tested for compression set by ASTM D 395B (70 hours at 204° C.). Hardness was measured on a Shore A type durometer. Results are read on an arbitrary scale where O is soft and 100 is hard. Parts were heat aged in an air oven for 2-4 days at 600° F. (316° C.) and then tested as above.

EXAMPLES 1-4

These examples demonstrate the superior stability, upon heat aging, of compositions treated with a small quantity of various quinacridone pigments (Examples 2-4) as compared with an untreated composition (Example 1):

| | Fluoroelastomer Composition | | | |
|---|---|---|---|---|
| | 1 | 2 | 3 | 4 |
| Polymer[1] | 100 | 100 | 100 | 100 |
| 18-Crown-6[2] | 3 | 3 | 3 | 3 |
| K$_2$AF[3] | 4.5 | 4.5 | 4.5 | 4.5 |
| TiO$_2$ | 20 | 17 | 18 | 18 |
| Pigment: | | | | |
| C.I. Orange-48 | | 3 | | |
| C.I. Violet-19, gamma | | | 2 | |
| C.I. Violet-19, beta | | | | 2 |
| Physical Properties | | | | |
| Stress/Strain | (Post Cure - 2 days) | | | |
| Initial | | | | |
| $M_{100}$, MPa | 10.5 | 12.8 | 9.9 | 10.8 |
| $T_B$, MPa | 15.8 | 16.7 | 14.1 | 13.3 |
| $E_B$, % | 140 | 130 | 130 | 120 |
| PS, % | 4 | 7 | 6 | 4 |
| Heat Aged | (2 days/316° C.) | | | |
| $M_{100}$, MPa | 5.7 | 7.2 | 6.3 | 6.3 |
| $T_B$, MPa | 11.5 | 14.7 | 14.5 | 11.4 |
| $E_B$, % | 250 | 210 | 240 | 200 |
| PS, % | 15 | 11 | 14 | 10 |
| Heat Aged | (4 days/316° C.) | | | |
| $M_{100}$, MPa | 3.8 | 5.0 | 4.8 | Not |
| $T_B$, MPa | 6.0 | 11.0 | 8.5 | |
| $E_B$, % | 360 | 290 | 300 | Run |
| PS, % | 34 | 19 | 21 | |
| Compression Set | (70 h/204° C.) | | | |
| Pellets, % | | | | |
| Initial | 27 | 28 | 30 | 24 |
| Heat Aged 2 days | 76 | 68 | 77 | 73 |
| Heat Aged 4 days | 92 | 72 | 89 | — |
| O-Rings, % | | | | |
| Initial | 67 | 71 | 74 | 76 |
| Heat Aged 2 days | 90 | 82 | 99 | 85 |
| Heat Aged 4 days | 100+ | 100+ | 100+ | — |
| Hardness, Shore A | 76 | 78 | 77 | 78 |

[1]Copolymer of tetrafluoroethylene (67.5 mole %), perfluoromethyl perfluorovinyl ether (32 mole %), and perfluoro(2-phenoxypropyl vinyl ether) (0.5 mole %)
[2]1,4,7,10,13,16-hexaoxacyclooctadecane
[3]Dipotassium salt of hexafluoroisopropylidenebis(4-hydroxybenzene)

EXAMPLES 5-9

These examples demonstrate the superior stability, upon heat aging, of compositions treated with a small quantity of various quinacridone pigments (Examples 6-9) as compared with an untreated composition (Example 5):

| Fluoroelastomer Composition | | | | | |
|---|---|---|---|---|---|
| | 5 | 6 | 7 | 8 | 9 |
| Polymer[1] | 100 | 100 | 100 | 100 | 100 |
| 18-Crown-6[2] | 3 | 3 | 3 | 3 | 3 |
| $K_2AF$[3] | 4.5 | 4.5 | 4.5 | 4.5 | 4.5 |
| $TiO_2$ | 20 | 17 | 17 | 17 | 18 |
| Pigment: | | | | | |
| C.I. Orange-48 | | 3 | | | |
| C.I. Red-206 | | | 3 | | |
| C.I. Orange-49 | | | | 3 | |
| Monastral ® Transparent Red B | | | | | 3 |

| | Physical Properties | | | | |
|---|---|---|---|---|---|
| | 5 | 6 | 7 | 8 | 9 |
| Stress/Strain | (Post cure - 2 days) | | | | |
| Initial | | | | | |
| $M_{100}$, MPa | 9.5 | 9.6 | 8.9 | 9.4 | 8.0 |
| $T_B$, MPa | 14.8 | 15.8 | 14.4 | 14.4 | 12.2 |
| $E_B$, % | 160 | 150 | 150 | 130 | 140 |
| PS, % | 2 | 4 | 4 | 4 | 3 |
| Heat Aged | (2 days/316° C.) | | | | |
| $M_{100}$, MPa | 5.0 | 5.3 | 5.9 | 5.8 | 3.5 |
| $T_B$, MPa | 10.6 | 12.8 | 12.9 | 12.3 | 10.6 |
| $E_B$, % | 240 | 220 | 210 | 200 | 230 |
| PS, % | 11 | 8 | 7 | 7 | 8 |
| Heat Aged | (4 days/316° C.) | | | | |
| $M_{100}$, MPA | 3.3 | 3.9 | 4.4 | 4.0 | 3.9 |
| $T_B$, MPa | 7.0 | 10.7 | 10.9 | 10.0 | 8.3 |
| $E_B$, % | 360 | 310 | 290 | 310 | 300 |
| PS, % | 24 | 14 | 12 | 15 | 14 |
| Compression Set | (70 h/204° C.) | | | | |
| O-Rings, % | | | | | |
| Initial | 77 | 78 | 77 | 77 | 78 |
| Heat aged (2 days) | 93 | 81 | 82 | 84 | 87 |
| Heat aged (4 days) | 100+ | 95 | 93 | 100 | 100+ |

[1]Copolymer of tetrafluoroethylene (67.5 mole %), perfluoromethyl perfluorovinyl ether (32 mole %), and perfluoro(2-phenoxypropyl vinyl ether) (10.5 mole %)
[2]1,4,7,13,16-hexaoxacyclooctadecane
[3]Dipotassium salt of hexafluoroisopropylidenebis(4-hydroxybenzene)

EXAMPLES 10-13

These examples demonstrate the superior stability, upon heat aging, of compositions treated with a small quantity of quinacridone pigments (Examples 11 and 13) as compared with untreated compositions (Examples 10 and 12), wherein the cure-site monomer of the terpolymer in the fluoroelastomer composition is a cyano monomer.

| Fluoroelastomer Composition | | | | |
|---|---|---|---|---|
| | 10 | 11 | 12 | 13 |
| Polymer[4] | 100 | 100 | 100 | 100 |
| Tetraphenyltin | 3 | 3 | 3 | 3 |
| DCH—18-Crown-6[5] | — | — | 1 | 1 |
| $TiO_2$ | 10 | 10 | 20 | 20 |
| C.I. Red-206 | — | 3 | — | 3 |

| | Physical Properties | | | |
|---|---|---|---|---|
| | 10 | 11 | 12[6] | 13[6] |
| Stress/Strain | (Post Cure - 2 days) | | | |
| Initial | | | | |
| $M_{100}$, MPa | 1.8 | 3.0 | 2.6 | 4.5 |
| $T_B$, MPa | 6.8 | 11.8 | 9.8 | 14.1 |
| $E_B$, % | 190 | 200 | 260 | 200 |
| Heat Aged | (2 days/316° C.) | | (3 days/316° C.) | |
| $M_{100}$, MPa | 1.3 | 1.7 | 2.3 | 2.3 |
| $T_B$, MPa | 6.3 | 6.8 | 7.8 | 9.8 |
| $E_B$, % | 300 | 260 | 310 | 300 |
| Compression Set | (70 h/204° C.) | | | |
| Pellets, % | | | | |
| Initial | 47 | 39 | — | — |
| Heat Aged 2 days | 22 | 17 | — | — |
| O-Rings, % | | | | |
| Initial | — | — | 34 | 28 |
| Heat Aged 3 days | — | — | 38 | 23 |

[4]copolymer of tetrafluoroethylene (69.7 mole %), perfluoromethyl perfluorovinyl ether (29.6 mole %), and perfluoro(8-cyano-5-methyl-3,6-dioxa-1-octene) (0.7 mole %)
[5]2,5,8,15,21-hexaoxatricyclo[20.4.0.0$^{9,14}$]hexacosane (i.e., dicyclohexyl-18-crown-6)
[6]After post cure in nitrogen for 2 days, these samples were heated for an additional day at 316° C. under nitrogen

EXAMPLES 14-15

These examples demonstrate the superior stability, upon heat aging, of compositions treated with a small quantity of various quinacridone pigments (Example 15) as compared with an untreated composition (Example 14):

| Fluoroelastomer Composition | | |
|---|---|---|
| | 14 | 15 |
| Polymer[4] | 100 | 100 |
| Tetraphenyltin | 3 | 3 |
| DC—18-Crown-6[5] | 1 | 1 |
| $SiO_2$ | 10 | 10 |
| C.I. Red-206 | — | 3 |

| | Physical Properties | |
|---|---|---|
| | 14[6] | 15[6] |
| Stress/Strain | (Post Cure - 2 days) | |
| Initial | | |
| $M_{100}$, MPa | 3.7 | 4.3 |
| $T_B$, MPa | 10.0 | 15.1 |
| $E_B$, % | 250 | 240 |
| Heat Aged | (3 days/316° C.) | |
| $M_{100}$, MPa | 2.5 | 2.7 |
| $T_B$, MPa | 8.1 | 9.5 |
| $E_B$, % | 340 | 350 |
| Compression Set | (70 h/204° C.) | |
| O-Rings, % | | |
| Initial | 51 | 57 |
| Heat Aged 3 days | 60 | 58 |

[4]Copolymer of tetrafluoroethylene (69.7 mole %), perfluoromethyl perfluorovinyl ether (29.6 mole %) and perfluoro(8-cyano-5-methyl-3,6-dioxa-isooctane) (0.7 mole %)
[5]2,5,8,15,18,21-hexaoxatricyclo[20.4.0.0$^{9,14}$]hexacosane (i.e., dicyclohexyl-18-crown-6)
[6]after post cure in nitrogen for 2 days, these samples were heated for an additional day at 316° C. under nitrogen

EXAMPLES 16-20

These examples demonstrate the beneficial effect of quinacridone pigment over a range of pigment concentrations:

| Fluoroelastomer Composition | | | | | |
|---|---|---|---|---|---|
| | 16 | 17 | 18 | 19 | 20 |
| Polymer[1] | 100 | 100 | 100 | 100 | 100 |
| $K_2AF$[3] | 4.5 | 4.5 | 4.5 | 4.5 | 4.5 |
| 18-Crown-6[2] | 3.0 | 3.0 | 3.0 | 3.0 | 3.0 |
| $TiO_2$ | 20 | 20 | 20 | 20 | 20 |
| C.I. Red-206 | 0 | 0.5 | 1.5 | 3.0 | 6.0 |

| Physical Properties | | | | | |
|---|---|---|---|---|---|
| | 16 | 17 | 18 | 19 | 20 |

| Stress/Strain | (Post Cure - 5 days) | | | | |
|---|---|---|---|---|---|
| Initial | | | | | |
| $M_{100}$, MPa | 9.6 | 9.6 | 9.0 | 10.3 | 9.9 |
| $T_B$, MPa | 13.1 | 12.6 | 14.7 | 14.7 | 15.9 |
| $E_B$, % | 130 | 120 | 140 | 140 | 150 |
| Heat Aged (2 days) | | | | | |
| $M_{100}$, MPa | 4.0 | 4.7 | 5.7 | 7.0 | 6.6 |
| $T_B$, MPa | 9.1 | 10.5 | 11.6 | 11.7 | 11.3 |
| $E_B$, % | 230 | 210 | 220 | 210 | 230 |
| Heat Aged (4 days) | | | | | |
| $M_{100}$, MPa | 2.3 | 3.1 | 3.9 | 4.3 | 4.4 |
| $T_B$, MPa | 3.0 | 6.2 | 7.2 | 7.4 | 6.8 |
| $E_B$, % | 370 | 330 | 310 | 310 | 300 |
| Compression Set | (70 h/204° C.) | | | | |
| Pellets, % | | | | | |
| Initial | 43 | 43 | 39 | 39 | 45 |
| Heat Aged (2 days) | 83 | 76 | 74 | 76 | 79 |
| Heat aged (4 days) | 77* | 84 | 85 | 81 | 82 |
| O-Rings, % | | | | | |
| Initial | — | 73 | 70 | 67 | 80 |
| Heat Aged (2 days) | 97 | 93 | 91 | 94 | 93 |
| Heat Aged (4 days) | 100+ | 100+ | 100+ | 100+ | 100+ |

[1]Copolymer of tetrafluroethylene(69.7 mole %), perfluoromethyl perfluorovinyl ether (29.6 mole %), and perfluoro(8-cyano-5-methyl-3,6-dioxa-1-octene) (0.7 mole %)
[2]1,4,7,10,13,16-hexacyclooctadecane
[3]Dipotassium salt of hexafluoroisopropylidenebis(4-hydroxybenzene)
*anomalous result

EXAMPLES 21-24

These examples demonstrate the beneficial effect of quinacridone pigment in fluoroelastomer compositions containing a variety of non-black fillers:

| | Fluoroelastomer Composition | | | |
|---|---|---|---|---|
| | 21 | 22 | 23 | 24 |
| Polymer[1] | 100 | 100 | 100 | 100 |
| $K_2AF$[3] | 4.5 | 4.5 | 4.5 | 4.5 |
| DCH—18-Crown-6[5] | 4.0 | 4.0 | 4.0 | 4.0 |
| $TiO_2$ (grade 1) R902 | 20 | 20 | — | — |
| $TiO_2$ (grade 2) R960 | — | — | 20 | 20 |
| C.I. Red-206 | — | 3 | — | 3 |

| | Physical Properties | | | |
|---|---|---|---|---|
| | 21 | 22 | 23 | 24 |
| Stress/Strain | (Post Cure - 5 days) | | | |
| Initial | | | | |
| $M_{100}$, MPa | 8.6 | 9.4 | 7.4 | 10.1 |
| $T_B$, MPa | 12.5 | 12.6 | 10.8 | 13.1 |
| $E_B$, % | 170 | 140 | 150 | 130 |
| Heat Aged (3 days) | | | | |
| $M_{100}$, MPa | Not | 5.0 | 2.7 | 4.6 |
| $T_B$, MPa | testable | 7.0 | 1.9 | 7.6 |
| $E_B$, % | | 310 | 350 | 300 |
| Compression Set | (70 h/204° C.) | | | |
| Pellets, % | | | | |
| Initial | 25 | 39 | 47 | 40 |
| Heat Aged (3 days) | n.t. | 100 | 100+ | 80 |
| O-Rings, % | | | | |
| Initial | 77 | 73 | 70 | 70 |
| Heat Aged (3 days) | n.t. | 73 | 100+ | 89 |

[1]Copolymer of tetrafluoroethylene (67.5 mole %), perfluoromethyl perfluorovinyl ether (32 mole %), and perfluoro(2-phenoxypropyl vinyl ether) (0.5 mole %)
[3]Dipotassium salt of hexafluoroisopropylidenebis(4-hydroxybenzene)
[5]2,5,8,15,18,21-hexaoxatricyclo[20.4.0.0$^{9,14}$]hexacosane

EXAMPLES 25-30

These examples demonstrate the beneficial effect of quinacridone pigment in fluoroelastomer compositions containing a variety of non-black fillers:

| | Fluoroelastomer Composition | | | | | |
|---|---|---|---|---|---|---|
| | 25 | 26 | 27 | 28 | 29 | 30 |
| Polymer[1] | 100 | 100 | 100 | 100 | 100 | 100 |
| $K_2AF$[3] | 4.5 | 4.5 | 4.5 | 4.5 | 4.5 | 4.5 |
| DCH-18-Crown-6[5] | 4.0 | 4.0 | 4.0 | 4.0 | 4.0 | 4.0 |
| $SiO_2$ | 10 | 10 | — | — | — | — |
| Talc | — | — | 13 | 13 | — | — |
| Asbestos | — | — | — | — | 11.5 | 11.5 |
| C.I. Red-206 | — | 3 | — | 3 | — | 3 |

| | Physical Properties | | | | | |
|---|---|---|---|---|---|---|
| | 25 | 26 | 27 | 28 | 29 | 30 |
| Stress/Strain | (Post Cure - 5 days) | | | | | |
| Initial | | | | | | |
| $M_{100}$, MPa | 12.7 | 12.8 | 10.8 | 11.8 | — | — |
| $T_B$, MPa | 13.7 | 13.0 | 12.5 | 13.6 | 13.1 | 14.1 |
| $E_B$, % | 110 | 100 | 120 | 120 | 90 | 90 |
| Heat Aged (2 days) | | | | | | |
| $M_{100}$, MPa | 6.5 | 9.0 | 5.6 | 8.5 | 7.6 | 9.9 |
| $T_B$, MPa | 10.5 | 12.3 | 7.7 | 10.5 | 6.1 | 10.0 |
| $E_B$, % | 240 | 170 | 300 | 200 | 240 | 160 |
| Compression Set | (70 h/204° C.) | | | | | |
| Pellets, % | | | | | | |
| Initial | 42 | 43 | 72 | 55 | 48 | 48 |
| Heat Aged (2 days) | 69 | 65 | 85 | 68 | 94 | 70 |
| O-Rings, % | | | | | | |
| Initial | 64 | 57 | 73 | 70 | 72 | 69 |
| Heat Aged (2 days) | 97 | 84 | 92 | 87 | 100+ | 100+ |

[1]Copolymer of tetrafluoroethylene (67.5 mole %), perfluoromethyl perfluorovinyl ether (32 mole %), and perfluoro(2-phenoxypropyl vinyl ether) (0.5 mole %)
[3]Dipotassium salt of hexafluoroisopropylidenebis(4-hydroxybenzene)
[5]2,5,8,15,18,21-hexaoxatricyclo[20.4.0.0$^{9,14}$]hexacosane

EXAMPLES 31-34

These examples demonstrate the beneficial effect of quinacridone pigment in fluoroelastomer compositions containing a variety of non-black fillers:

| | Fluoroelastomer Composition | | | |
|---|---|---|---|---|
| | 31 | 32 | 33 | 34 |
| Polymer[1] | 100 | 100 | 100 | 100 |
| $K_2AF$[3] | 4.5 | 4.5 | 3.0 | 3.0 |
| DCH—18-Crown-6[5] | 4.0 | 4.0 | — | — |
| 18-Crown-6[2] | — | — | 3.0 | 3.0 |
| Hydrated alumina | 11.2 | 11.2 | — | — |
| $ZrO_2$ | — | — | 26 | 26 |
| C.I. Red-206 | — | 5 | — | 2 |

| | Physical Properties | | | |
|---|---|---|---|---|
| | 31 | 32 | 33 | 34 |
| Stress/Strain | (Post Cure - 2 days) | | | |
| Initial | | | | |
| $M_{100}$, MPa | 7.3 | 9.2 | 6.5 | 7.7 |
| $T_B$, MPa | 11.3 | 13.2 | 12.3 | 15.7 |
| $E_B$, % | 140 | 160 | 170 | 180 |
| Heat Aged (2 days) | | | | |
| $M_{100}$, MPa | 2.4 | 4.5 | 3.2 | 4.8 |
| $T_B$, MPa | 5.5 | 8.2 | 7.7 | 15.1 |
| $E_B$, % | 400 | 290 | 330 | 280 |
| Heat Aged (4 days) | | | | |
| $M_{100}$, MPa | — | — | Not | 3.3 |
| $T_B$, MPa | — | — | Testable | 8.0 |
| $E_B$, % | | | | 390 |
| Compression Set | (70 h/204° C.) | | | |
| Pellets, % | | | | |
| Initial | 39 | 56 | 41 | 36 |

| | | | | |
|---|---|---|---|---|
| Heat Aged (2 days) | — | — | n.t. | n.t. |
| Heat Aged (4 days) | — | — | n.t. | n.t. |
| O-Rings, % | | | | |
| Initial | n.t. | 62 | 62 | 56 |
| Heat Aged (2 days) | — | — | 100+ | 76 |
| Heat Aged (4 days) | — | — | n.t. | n.t. |

[1]Copolymer of tetrafluoroethylene (67.5 mole %), perfluoromethyl perfluorovinyl ether (32 mole %), and perfluoro(2-phenoxypropyl vinyl ether) (0.5 mole %)
[2]1,4,7,10,13,16-hexacyclooctadecane
[3]Dipotassium salt of hexafluoroisopropylenebis(4-hydroxybenzene)
[5]2,5,8,15,18,21-hexaoxatricyclo[20.4.0.0$^{9,14}$]hexacosane

EXAMPLES 35-36

These examples demonstrate the superior stability, upon heat aging, of compositions treated with a small quantity of quinacridone pigment (Example 36) as compared with untreated compositions (Example 35), wherein the monomer concentrations differ from that exemplified above.

| | Fluoroelastomer Composition | |
|---|---|---|
| | 35 | 36 |
| Polymer[7] | 100 | 100 |
| K$_2$AF[3] | 4.5 | 4.5 |
| 18-Crown-6[2] | 4.0 | 4.0 |
| TiO$_2$ | 20 | 20 |
| C.I. Red-202 | 0 | 4.0 |

| | Physical Properties | |
|---|---|---|
| | 35 | 36 |
| Stress/Strain | (Post Cure - 5 days) | |
| Initial | | |
| M$_{100}$, MPa | 11.6 | 13.5 |
| T$_B$, MPa | 17.2 | 16.6 |
| E$_B$, % | 150 | 130 |
| Heat Aged (2 days) | | |
| M$_{100}$, MPa | 5.9 | 6.8 |
| T$_B$, MPa | 9.2 | 10.3 |
| E$_B$, % | 330 | 280 |
| Heat Aged (4 days) | | |
| M$_{100}$, MPa | Not | 5.2 |
| T$_B$, MPa | Test- | 4.0 |
| E$_B$, % | able | 340 |
| Compression Set | (70 h/204° C.) | |
| Pellets, % | | |
| Initial | 40 | 44 |
| Heat Aged (4 days) | 100+ | 96 |
| O-Rings, % | | |
| Initial | 79 | 77 |
| Heat Aged (4 days) | Not Testable | 100+ |

[2]1,4,7,10,13,16-hexacyclooctadecane
[3]Dipotassium salt of hexafluoroisopropylidenebis(4-hydroxybenzene)
[7]Copolymer of tetrafluoroethylene (71.5 mole %), perfluoromethyl perfluorovinyl ether (28 mole %), and perfluoro(2-phenoxypropylvinylether) (0.5 mole %)

EXAMPLES 37-41

These examples demonstrate the superior stability, upon heat aging, of compositions treated with a small quantity of quinacridone pigment (Example 38) as compared with compositions treated with other type pigments (Examples 39-41), as well as with untreated compositions (Example 37):

| | Fluoroelastomer Composition | | | | |
|---|---|---|---|---|---|
| | 37 | 38 | 39 | 40 | 41 |
| Polymer[1] | 100 | 100 | 100 | 100 | 100 |
| 18-Crown-6[2] | 3 | 3 | 3 | 3 | 3 |
| K$_2$AF[3] | 4.5 | 4.5 | 4.5 | 4.5 | 4.5 |
| TiO$_2$ | 20 | 17 | 18 | 18 | 18 |
| C.I. Orange-48 | — | 3 | — | — | — |
| C.I. Green-75 | — | — | 2 | — | — |
| C.I. Blue-15[5] | — | — | — | 2 | — |
| Black SAF[6] | — | — | — | — | 2 |

| | Physical Properties | | | | |
|---|---|---|---|---|---|
| | 37 | 38 | 39 | 40 | 41 |
| Stress/Strain | (Post Cure - 2 days) | | | | |
| Initial | | | | | |
| M$_{100}$, MPa | 10.5 | 12.8 | 9.8 | 10.2 | 11.2 |
| T$_B$, MPa | 15.8 | 16.7 | 15.5 | 13.2 | 15.4 |
| E$_B$, % | 140 | 130 | 140 | 120 | 130 |
| PS, % | 4 | 7 | 5 | 3 | 3 |
| Heat Aged (2 days) | | | | | |
| M$_{100}$, MPa | 5.7 | 7.2 | Not | Not | 5.0 |
| T$_B$, MPa | 11.5 | 14.7 | | | 8.1 |
| E$_B$, % | 250 | 210 | test- | test- | 280 |
| PS, % | 15 | 11 | able | able | 17 |
| Heat Aged (4 days) | | | | | |
| M$_{100}$, MPa | 3.8 | 5.0 | Not | Not | Not |
| T$_B$, MPa | 6.0 | 11.0 | | | |
| E$_B$, % | 360 | 290 | Run | Run | Run |
| PS, % | 34 | 19 | | | |
| Compression Set | (70 h/204° C.) | | | | |
| Pellets, % | | | | | |
| Initial | 27 | 28 | 30 | 27 | 24 |
| Heat Aged (2 days) | 76 | 68 | De-graded | Surface Melted | 75 |
| Heat Aged (4 days) | 92 | 72 | 89 | | |
| O-Rings, % | | | | | |
| Initial | 67 | 71 | 78 | 75 | 77 |
| Heat Aged (2 days) | 90 | 82 | Melted | Melted | 100 |
| Heat Aged (4 days) | 100+ | 100+ | — | — | — |
| Hardness, Shore A | 76 | 78 | 75 | 78 | 79 |

[1]Copolymer of tetrafluoroethylene (67.5 mole %), perfluoromethyl perfluorovinyl ether (32 mole %), and perfluoro(2-phenoxypropyl vinyl ether) (0.5 mole %)
[2]1,4,7,10,13,16-hexaoxacyclooctadecane
[3]Dipotassium of hexafluoroisopropylidenebis(4-hydroxybenzene)
[5]Copper phthalocyanine pigment
Carbon black

INDUSTRIAL APPLICABILITY

The fluoroelastomer compositions of the present invention are useful in the manufacture of finished parts such as O-rings, flange seals, gasket stock, pump diaphragms and liners. The extraordinary physical properties and resistance to environmental attack of such parts made from these compositions make them particularly well suited for applications in process streams subject to severe fluid service at inline temperatures as high as 700° F. (371° C.) or in streams carrying highly corrosive fluids, such as hydrogen sulfide.

BEST MODE

Although the best mode of the present invention, i.e., the single best fluoroelastomer composition of the present invention, will depend upon the particular desired end use and the specific requisite combination of properties for that use, the single most preferred composition of the present invention is that described in detail in Example 24.

I claim:
1. A vulcanizable composition comprising a fluoroelastomer which is a terpolymer derived from tetrafluoroethylene, perfluoromethyl perfluorovinyl ether and a cure-site monomer, at least one non-black filler, and a small quantity of at least one quinacridone-type pigment selected from the group consisting of quinacridone, quinacridone quinone, substituted quinacridone, substituted quinacridone quinone, and mixtures and solid solutions of such substituted and unsubstituted quinacridones and quinacridone quinones.

2. A composition of claim 1 wherein the cure-site monomer is selected from the group consisting of:
   (a) perfluoro(4-cyanobutyl vinyl ether),
   (b) perfluoro(4-carbomethoxybutyl vinyl ether),
   (c) perfluoro(2-phenoxypropyl vinyl ether),
   (d) perfluoro(3-phenoxypropyl vinyl ether), and
   (e) perfluoro(8-cyano-5-methyl-3,6-dioxa-1-octene).

3. A composition of claim 1 wherein the terpolymer consists essentially of 53–79.8 mole percent of tetrafluoroethylene, 20–45 mole percent of perfluoromethyl perfluorovinyl ether and 0.2–2 mole percent of the cure-site monomer.

4. A composition of claim 2 wherein the terpolymer consists essentially of 53–79.8 mole percent of tetrafluoroethylene, 20–45 mole percent of perfluoromethyl perfluorovinyl ether and 0.2–2 mole percent of the cure-site monomer.

5. A composition of claim 2 wherein the cure-site monomer is perfluoro(2-phenoxypropyl vinyl ether).

6. A composition of claim 5 wherein the terpolymer consists essentially of 65.4–73.6 mole percent of tetrafluoroethylene, 26–34 mole percent of perfluoromethyl perfluorovinyl ether and 0.5 mole percent of perfluoro(2-phenoxypropyl vinyl ether).

7. A composition of claim 1 wherein the non-black filler is selected from the group consisting of titanium dioxide, zirconium dioxide, silica, clay asbestos and hydrated aluminum oxide.

8. A composition of claim 7 wherein the non-black filler is titanium dioxide.

9. A composition of claim 1 wherein the quinacridone-type pigment is selected from the group consisting of quinacridone, quinacridone quinone, substituted quinacridone, substituted quinacridone quinone, and mixtures and solid solutions thereof.

10. A composition of claim 9 wherein the quinacridone-type pigment is a solid solution containing quinacridone.

11. A composition of claim 1 wherein quinacridone-type pigment is present in the composition in an amount of 0.1–10 phr.

* * * * *